United States Patent
Ciulla et al.

(10) Patent No.: US 9,538,697 B2
(45) Date of Patent: Jan. 10, 2017

(54) DAMPING FLANGE FOR AGRI-HUB

(71) Applicants: Luca Ciulla, Turin (IT); Carlo Maldera, Giaveno (IT)

(72) Inventors: Luca Ciulla, Turin (IT); Carlo Maldera, Giaveno (IT)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/715,644

(22) Filed: May 19, 2015

(65) Prior Publication Data

US 2015/0327427 A1    Nov. 19, 2015

(30) Foreign Application Priority Data

May 19, 2014 (IT) ............... TO2014A0393

(51) Int. Cl.
| | |
|---|---|
| *F16C 35/07* | (2006.01) |
| *A01B 71/04* | (2006.01) |
| *F16C 19/54* | (2006.01) |
| *F16C 33/60* | (2006.01) |
| *F16C 19/18* | (2006.01) |

(52) U.S. Cl.
CPC ............ *A01B 71/04* (2013.01); *F16C 35/07* (2013.01); *F16C 19/184* (2013.01); *F16C 2226/62* (2013.01); *F16C 2310/00* (2013.01)

(58) Field of Classification Search
CPC ......... F16C 19/08; F16C 19/184; F16C 35/07; F16C 2310/00; F16C 2226/62; F16C 2208/18; A01B 15/16; A01B 71/04; B60B 27/0005

USPC ............... 384/296–297, 460, 492, 504, 536, 547,384/544, 589; 172/394, 604
See application file for complete search history.

(56) References Cited

U.S. PATENT DOCUMENTS

| | | | | |
|---|---|---|---|---|
| 1,584,616 | A * | 5/1926 | Cothran | A01B 23/06 384/460 |
| 1,701,518 | A * | 2/1929 | Walker | F16F 15/1442 74/574.4 |
| 2,299,010 | A * | 10/1942 | Doman | F01P 5/02 416/134 R |
| 2,698,565 | A * | 1/1955 | Carney | A01B 39/14 172/574 |
| 2,961,894 | A * | 11/1960 | Oles | F16F 15/1442 29/450 |
| 3,861,828 | A * | 1/1975 | Biermann | B64C 11/008 416/145 |
| 4,252,385 | A * | 2/1981 | Leitzel | F16C 33/74 384/138 |

(Continued)

FOREIGN PATENT DOCUMENTS

| | | |
|---|---|---|
| BE | 368492 A | 5/1936 |
| DE | 20012666 U1 | 12/2000 |

(Continued)

*Primary Examiner* — Marcus Charles
(74) *Attorney, Agent, or Firm* — Bryan Peckjian; SKF USA Inc. Patent Dept.

(57) ABSTRACT

A hub-bearing assembly for rotatably mounting a tilling disc about an axis of rotation. The hub-bearing assembly includes an annular hub providing an axially extending tubular portion, comprising a housing and a radially outer flange for mounting a disc. A bearing unit is mounted within the housing. An elastic damping body axially is fitted between the radially outer flange and the disc.

6 Claims, 3 Drawing Sheets

(56) References Cited

U.S. PATENT DOCUMENTS

| | | | | | |
|---|---|---|---|---|---|
| 4,295,691 | A | * | 10/1981 | Rubenthaler | F16F 1/3732 384/297 |
| 5,802,995 | A | * | 9/1998 | Baugher | A01C 7/205 111/140 |
| 6,082,276 | A | * | 7/2000 | Klein | A01C 5/064 111/164 |
| 6,364,426 | B1 | * | 4/2002 | Horne | B24B 5/065 384/544 |
| 7,073,949 | B2 | * | 7/2006 | Ruckle | A01B 71/04 384/460 |
| 7,475,738 | B2 | * | 1/2009 | Frasier | A01B 71/04 111/140 |
| 8,397,602 | B2 | * | 3/2013 | Christenson | F16F 15/126 74/574.4 |
| 8,899,345 | B2 | * | 12/2014 | Lazcano Lasa | A01B 23/06 172/604 |
| 2003/0201108 | A1 | * | 10/2003 | Linden | F16C 35/06 172/604 |
| 2007/0147719 | A1 | * | 6/2007 | Komori | B60B 27/00 384/492 |
| 2012/0045155 | A1 | * | 2/2012 | Morero | A01B 71/04 384/480 |
| 2014/0029885 | A1 | * | 1/2014 | Ciulla | A01B 71/04 384/536 |

FOREIGN PATENT DOCUMENTS

| | | | | |
|---|---|---|---|---|
| EP | 2689648 A1 | | 1/2014 | |
| JP | 02095152 A | * | 4/1990 | |
| JP | 07026950 A | * | 1/1995 | |
| JP | 2000074127 A1 | * | 3/2000 | B60K 5/12 |
| WO | WO 0219791 A1 | * | 3/2002 | A01B 15/16 |
| WO | WO 02070285 A1 | * | 9/2002 | B25B 27/0035 |
| WO | 2007105185 A2 | | 9/2007 | |

* cited by examiner

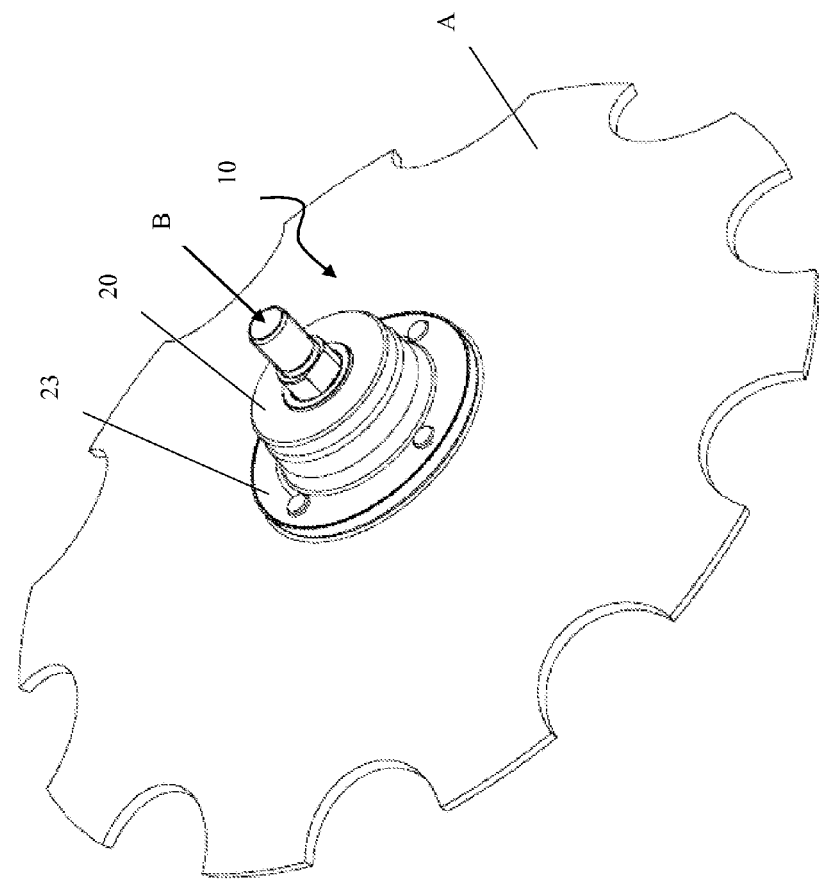
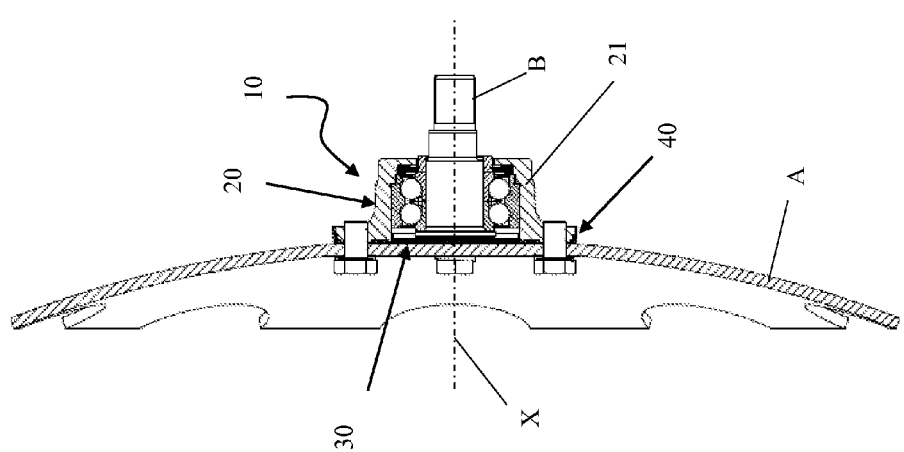

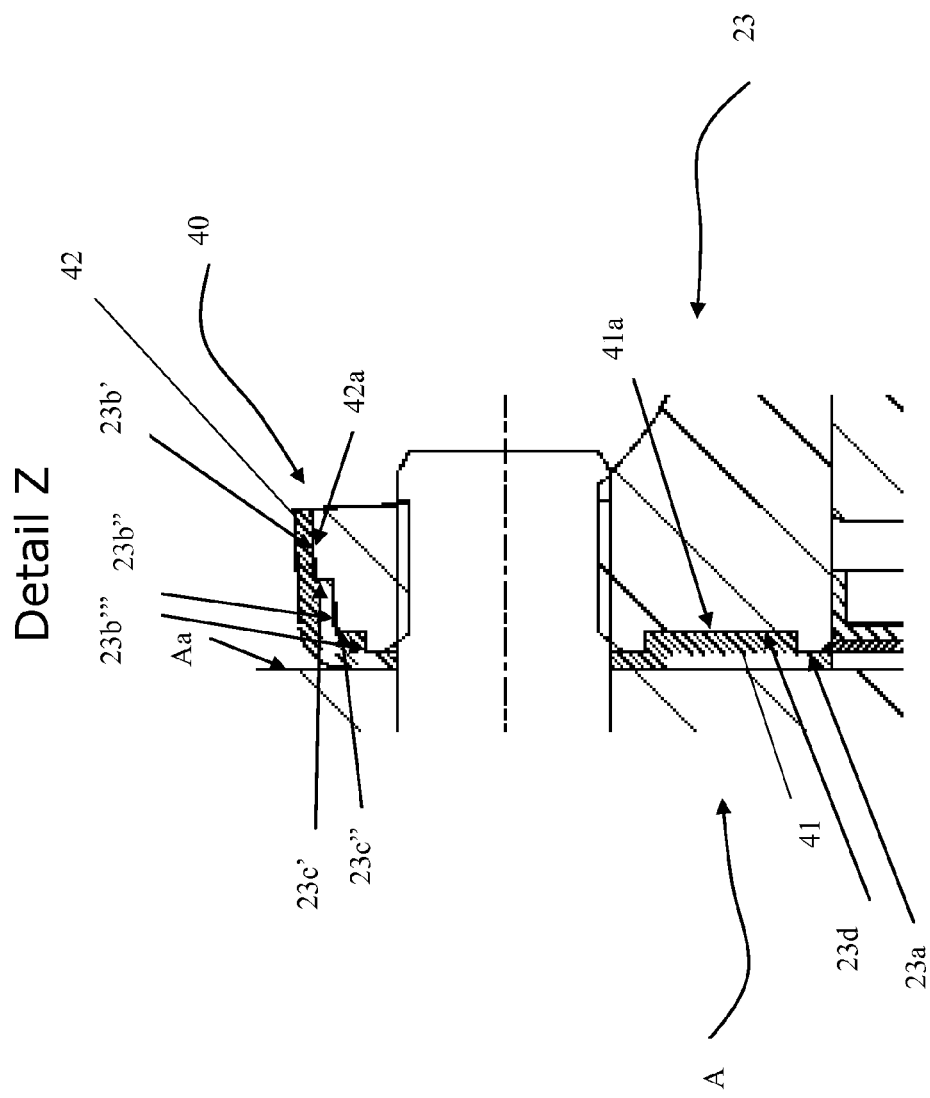

DAMPING FLANGE FOR AGRI-HUB

CROSS REFERENCE TO RELATED APPLICATIONS

This is a Non-Provisional Patent Application, filed under the Paris Convention, claims the benefit of Italy Patent (IT) Application Number TO2014A000393 filed on 19 May 2014, which is incorporated herein by reference in its entirety.

TECHNICAL FIELD

The present invention is related to a hub-bearing assembly for an agricultural tilling disc.

As known, discs for agricultural use are usually rotatably assembled on corresponding spindle, projecting from the frame of a plough or other agricultural machine.

BACKGROUND ART

From document WO 2002/019791 A is known a hub-bearing assembly for rotatably mounting a tilling disc for agricultural use, around an axis of rotation. The assembly comprises an annular hub, having a tubular portion axially extending, which defines a substantially cylindrical housing and a radially outer flange for fixing the disc. In the housing a bearing unit is located, the bearing unit comprising an outer ring, one or two inner rings and one or two set of rolling bodies, interposed between inner and outer rings. In other solutions, the outer ring is in one piece with the flanged hub.

During the working life, impacts of the disc against stones and similar bodies damage the bearing raceways, reducing the bearing lifetime.

BRIEF SUMMARY OF THE INVENTION

Aim of the present invention is to realize a hub-bearing assembly for an agricultural tilling disc, which overcomes the above mentioned inconveniences.

This and other purposes and advantages, which will be better hereafter understood, are obtained according to an aspect of the invention by a hub-bearing assembly as defined in the enclosed independent claim.

Further embodiments of the invention, preferred and/or particularly advantageous, are described according to the characteristics as in the enclosed dependent claims.

In practice, the hub-bearing assembly comprises an elastic damping body coupled to the hub flange and facing the disc for agricultural use. The elastic damping body absorbs part of dynamic loads, due to the impacts of the disc against the stones. Therefore, the dynamic loads no more fully transmitted to the bearing and its rolling bodies, do not remarkably damage the bearing raceways.

BRIEF DESCRIPTION OF THE DRAWINGS

The invention will be now described by reference to the enclosed drawings, which show some non-limitative embodiments, namely:

FIG. 1 is an axial cross section of a disc for agricultural use, the disc being rotatably assembled around a spindle by a hub-bearing assembly, according to an embodiment of the invention;

FIG. 2 is a perspective view of the disc with hub-bearing assembly and spindle of FIG. 1;

FIG. 4 is an enlarged detail of the cross section in FIG. 3.

DETAILED DESCRIPTION OF THE INVENTION

Figure 3:
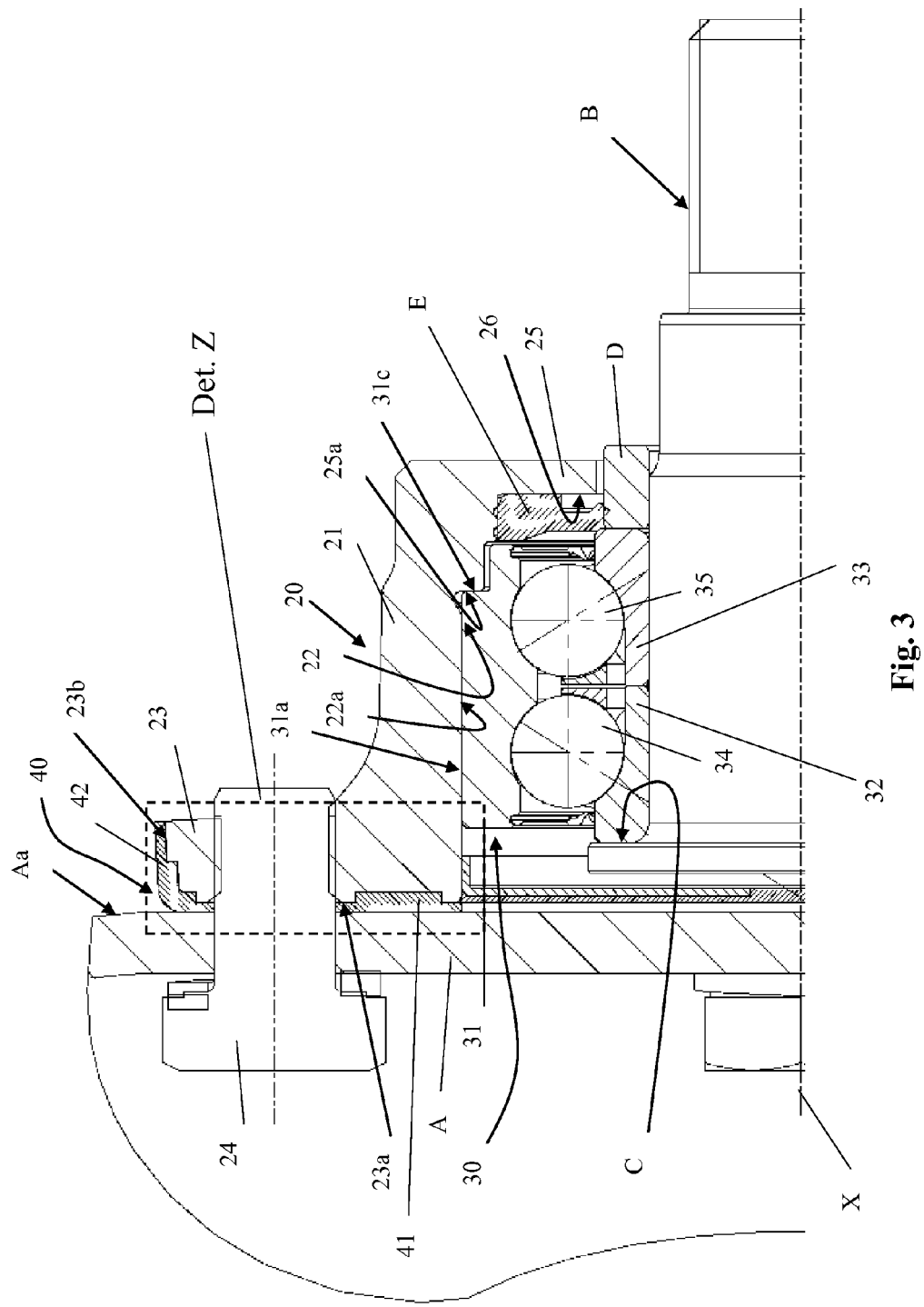
FIG. 3 is an enlarged view, partly in cross section, of the hub-bearing assembly and the spindle of FIG. 1.

With reference to the above figures, a hub-bearing assembly according to an embodiment of the invention, referenced as a whole with 10, is used for mounting a tilling disc A in a freely rotatable way around an axis of rotation x, which is defined by a spindle B projecting from an agricultural machine or tool (not shown), as an example, a plow, a harrow or other similar tools. Features of disc A, which can be a whatever known disc, for example a disc for plowing or a disc for seeding (suitable for opening furrows in a previously plowed land), are not relevant for the invention understanding and therefore will not be described in further details.

With reference to FIG. 3, the hub-bearing assembly 10 comprises a hub 20, a bearing unit 30 housed in the hub 20 and an elastic damping body 40, axially interposed between the hub and the disc A.

In particular, the hub 20 has a substantially annular shape and presents a main tubular portion 21 axially extended, which internally defines a substantially cylindrical housing 22 for the bearing unit 30. The housing is radially confined by an inner wall 22a substantially cylindrical. Throughout the present description and in the claims, the terms and expressions indicating positions and orientations such as "radial" and "axial" are to be taken to refer to the axis of rotation x of the bearing unit 30.

From a first axial end of the tubular portion 21 of the hub, a radially outer flange 23 extends, the flange having a plurality of axial holes for mounting the disc A by means of suitable fastening means, for example screws 24. From a second axial end of the tubular portion 21 a radially inner flange 25 extends, axially confining the housing 22 on the very far side with respect to the disc.

The bearing unit 30 is a so called first generation unit, without radially projecting flanges. The bearing unit 30 comprises a rotatable outer ring 31, a pair of inner rings 32, 33 side by side assembled on the spindle B and a dual set of rolling bodies 34, 35, for example spheres, interposed between the outer ring 31 and the inner rings 32, 33. The rotatable outer ring 31 presents a radially outer wall 31c substantially cylindrical, which is coupled with the inner wall 22a of the tubular portion 21 of the hub 20.

The inner rings 32, 33 are axially tightened against a shoulder C of the spindle, by means of a spacer D, mounted on the spindle, which is pre-loaded by means of a nut not shown), according to a known embodiment.

The inner flange 25 radially extends towards the spindle and presents a radial surface 25a for locking a radial surface 31c of the bearing outer ring 31. Moreover, in the shown embodiment the flange 25 forms an annular groove 26 towards the bearing and suitable to accommodate a sealing device, schematically shown and referenced with E, being the seal deputed to slide against the spacer D or other component steadily connected to the spindle B, with the aim to hermetically seal the bearing housing 22 towards outside.

The elastic damping body 40 allows the disc A to elastically absorb impacts, received during use, and reduce damages, undesired movements and arising clearances, due to impacts transmitted by the disc.

The elastic damping body 40 is made of an elastomeric and plastic material and is located on the side facing the tilling disc A, more precisely, is located on a substantially annular surface 23a of the flange 23, in an axially external position. As a consequence, the elastic damping body faces the disc A and in particular a substantially circular surface Aa, in an axially internal position.

According to a preferred embodiment, the elastic damping body 40 is shaped as a cap, having a substantially annular wall 41, which is steadily connected to a substantially cylindrical wall 42, the cylindrical wall 42 being in a radially external position respect to the annular wall 41.

The annular wall 41 of the elastic damping body 40 is axially interposed between the flange 23 of the hub 20 and the disc A. More in detail, the annular wall is located on the annular surface 23a of the flange 23, or when the disc A is mounted, is axially interposed between the annular surface 23a of the flange 23 and the circular and axially internal surface Aa of the disc A.

The cylindrical wall 42 of the elastic damping body 40 is radially coupled with the flange 23, by means of a substantially cylindrical surface 42a of the cylindrical wall 42, in a radially internal position, and a corresponding substantially cylindrical surface 23b of the flange 23, in a radially external position.

The elastic damping body 40 is coupled to the flange 23 by means of known processes. As an example, the coupling between the two components can be realized co-molding the elastic damping body 40 on the flange 23 or gluing them or connecting them by mechanical fastening means.

Preferably, the substantially cylindrical surface 23b of the flange 23 is stepwise shaped, in other words is formed by a plurality of cylindrical portions 23b', 23b'', 23b''', having decreasing diameters and each other connected by annular surfaces 23c', 23c''. As a consequence, also the surface 42a of the cylindrical wall 42 of the elastic damping body 40 is stepwise shaped as well. In this way, the coupling surface between elastic damping body and flange increases; moreover, the stepwise shape of the two coupling surfaces improves the grip between elastic body and flange and consequently a more stable coupling between them is obtained.

Advantageously, the flange 23 is provided with an annular groove 23d, located along the substantially annular surface 23a and consequently the annular wall 41 of the elastic damping body 40 has an annular protrusion 41a, which is coupled with the annular groove 23d. In this way, the thickness of the elastic damping body can be increased, obtaining at the same time a greater damping effect and a better grip in the coupling elastic body-flange.

In definitive, the elastic body 40 interposed between the disc and the flange can absorb vibrations and hits, which derive by the impact of the disc against stone materials on the agricultural land. In practice, the elastic damping body works as a shock absorber. In fact, all impulsive load due to impacts against stones are not completely transmitted to the bearing and in particular to its rolling bodies, because of the damping effect of the elastic damping body. This effect avoids damages to the raceways and consequently increases the bearing lifetime. The improved bearing lifetime means a cost reduction of the whole device for agricultural use.

Finally, it has to be remarked that the proposed solution does not bring any manufacturing difficulty for realizing the whole bearing-hub assembly. In fact, according to this solution, standard dimensions and shapes can be used for the bearings. Just one component requires further machining operations, the flange of the hub. Anyway, being the flange made of a not hardened metal, such further machining operations do not require special processes or tools. Moreover, the interposition of the elastic damping body between the flange and the disc make simpler the production process of both the bearing and the whole bearing-hub assembly, provided with the damping body. At the same time, this solution does not influence at all the desired pre-stress conditions of the bearing, being the bearing direct interfaces made of metallic components.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A hub-bearing assembly for rotatably mounting a tilling disc about an axis of rotation, the assembly comprising:
   an annular hub providing an axially extending tubular portion, comprising a housing and a radially outer flange for mounting a disc;
   a bearing unit mounted within the housing, the bearing unit comprising:
      an outer ring,
      a pair of inner rings, and
      a dual set of rolling elements, interposed between the outer ring and the pair of inner rings; and
   an elastic damping body axially fitted on the radially outer flange, on the side facing the mountable tilling disc, the elastic damping body further comprising a substantially annular wall, the substantially annular wall is steadily connected to a substantially cylindrical wall, the cylindrical wall being in a radially external position respect to the annular wall, the elastic damping body is fabricated of one of an elastomeric material or a plastic material, wherein the cylindrical wall of the elastic damping body is radially coupled with the flange, by:
      a substantially cylindrical surface of the cylindrical wall, in a radially internal position, and
      a corresponding substantially cylindrical surface of the flange, in a radially external position.

2. A hub-bearing assembly according to claim 1, wherein the elastic damping body is located on a substantially annular surface of the flange, in an axially external position.

3. A hub-bearing assembly according to claim 2, the flange further comprising an annular groove, wherein the annular groove is located along the substantially annular surface.

4. A hub-bearing assembly according to claim 3, wherein the annular wall of the elastic damping body has an annular protrusion, wherein the annular protrusion is coupled with the annular groove.

5. A hub-bearing assembly according to claim 1, wherein the substantially cylindrical surface of the flange is formed by a plurality of cylindrical portions, having decreasing diameters and each other connected by annular surfaces.

6. A hub-bearing assembly for rotatably mounting a tilling disc about an axis of rotation, the assembly comprising:
   an annular hub providing an axially extending tubular portion, comprising a housing and a radially outer flange for mounting a disc;

a bearing unit mounted within the housing, the bearing unit comprising:
an outer ring,
a pair of inner rings, and
a dual set of rolling elements, interposed between the outer ring and the pair of inner rings; and an elastic damping body axially fitted on the radially outer flange, on the side facing the mountable tilling disc, the elastic damping body is co-molded with the flange, wherein the substantially cylindrical surface of the flange is formed by a plurality of cylindrical portions, having decreasing diameters and each other connected by annular surfaces.

\* \* \* \* \*